United States Patent [19]

Suga

[11] 4,090,188
[45] May 16, 1978

[54] DOT MATRIX CONVERTER

[75] Inventor: Gojiro Suga, Ebina, Japan

[73] Assignee: Fuji Xerox Co., Ltd., Tokyo, Japan

[21] Appl. No.: 702,472

[22] Filed: Jul. 6, 1976

[30] Foreign Application Priority Data

Jul. 7, 1975 Japan .................................. 50-83292

[51] Int. Cl.$^2$ ............................................... G06F 3/14
[52] U.S. Cl. .......................... 340/324 AD; 340/324 A;
340/324 M; 178/30
[58] Field of Search ........................... 235/151.22, 151;
340/324 AD; 346/78; 358/280, 133, 138;
364/200; 178/30

[56] References Cited
U.S. PATENT DOCUMENTS

| | | | |
|---|---|---|---|
| 3,573,789 | 4/1971 | Sharp et al. | 340/324 AD |
| 3,754,229 | 8/1973 | Manber | 340/324 AD |
| 3,833,891 | 9/1974 | Howard et al. | 364/900 |
| 3,878,536 | 4/1975 | Gilliam | 340/324 AD |
| 3,896,428 | 7/1975 | Williams | 340/324 AD |
| 3,903,517 | 9/1975 | Hafner | 340/324 AD |
| 3,921,164 | 11/1975 | Anderson | 340/324 AD |
| 3,924,225 | 12/1975 | Langnickel | 340/324 AD |
| 3,928,845 | 12/1975 | Clark | 340/324 AD |
| 3,976,982 | 8/1976 | Eiselsen | 235/151 |

Primary Examiner—Gareth D. Shaw
Assistant Examiner—Michael C. Sachs

Attorney, Agent, or Firm—Gerald J. Ferguson, Jr.;
Joseph J. Baker

[57] ABSTRACT

A dot matrix converter comprising means for providing an original character pattern comprising a dot matrix; means for dividing the original matrix into row groups and column groups, the number of groups being respectively one greater than the row difference and the column difference between the original matrix size and a desired matrix size to which the original matrix is to be converted; row (or column) size converting means which compare the individual opposed bits in the rows (or columns) on the opposite sides of dividing lines between adjacent row (or column) groups and inserts a logical "1" bit between the compared bits when both bits are logical "1" or inserts a logical "0" bit in all other cases, thereby effecting the addition of one row (or column) between the divided adjacent row (or column) groups; and column (or row) size converting means which compare the individual opposed bits in the columns (or rows) on the opposite sides of the dividing lines between adjacent column (or row) groups, and inserts a logical "1" bit between the compared bits when both bits are logical "1" or inserts a logical "0" bit in all other cases, thereby effecting the addition of one column (or row) between the divided adjacent column (or row) groups.

3 Claims, 9 Drawing Figures

DOT MATRIX CONVERTER

BACKGROUND OF THE INVENTION

1. Field of the Invention

The present invention relates to a dot matrix converter for use in a dot matrix printer capable of changing the size of character or pattern in printing.

2. Discussion of the Prior Art

In a conventional dot matrix printer, individual dots to be printed and data bits of a memory circuit or a character pattern generator directly correspond to each other. That is, if the matrix size of a character font stored in a character memory is one size, the size of the printed character is also limited to one size. Consequently, in order to print a character of larger dimensions, it would be necessary to increase the capacity of the memory to the desired size. However, this can be quite disadvantageous with respect to certain printers and particularly with respect to a Chinese-character printer which prints a great number of different characters.

SUMMARY OF THE INVENTION

The present invention eliminates the disadvantages of the prior art, and a primary object thereof is to provide an improved dot matrix converter which is capable of generating, from a character font comprising a dot matrix of one size, character patterns of a different size comprising dot matrices of several sizes. According to the present invention, a character pattern consisting of an original dot matrix is read from a character memory and is divided into row groups and column groups where the number of row groups and the number of column groups is respectively one greater than the row difference and the column difference between the row-by-column size ($m \times n$) of the original dot matrix and the row-by-column size ($k \times l$) of a desired, converted matrix. That is, the original character pattern is divided into ($k - m + 1$) groups of rows and ($l - n + 1$) groups of columns. In order to convert the row size, a "1" output bit is inserted between adjacent row groups whenever opposed bits in the columns on the opposite sides of the dividing lines between adjacent row groups are both logical "1". An "0" output bit is inserted in any other case. The output bits inserted between the divided row groups form a new row, thereby increasing the number of rows in the converted matrix. After the dot matrix has been converted with respect to the number of rows, the column size can be converted by inserting between adjacent column groups a "1" output bit whenever opposed bits on the opposite sides of the dividing line between adjacent column groups are both logical "1". A bit "0" output bit is inserted in any other case. The output bits inserted between the divided column groups form a new column, thereby increasing the number of columns in the converted matrix. And thus, the dot matrix is converted from a $m \times n$ matrix into a $k \times l$ matrix. It is of course possible to perform column-size conversion first and subsequently row-size conversion in a sequence reverse to that of the above. The instance where a logical signal is "1" may be optionally set as to correspond to either a "black" dot or a "white" dot to be printed.

Other objects and advantages of this invention will be apparent from a reading of the following specification and claims taken with the drawing.

DETAILED DESCRIPTION OF PREFERRED EMBODIMENTS OF THE INVENTION

Figure 1:
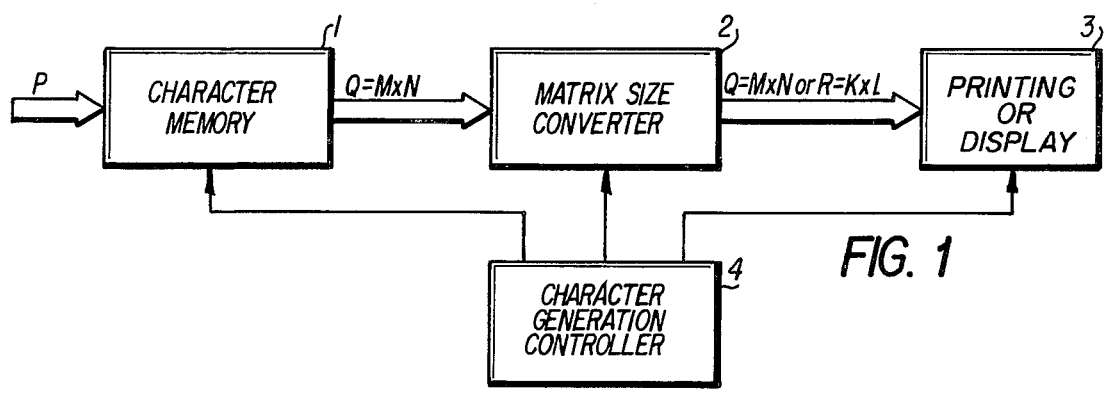
FIG. 1 is a block diagram of a printer in which the present invention may be incorporated.

Hereinafter the present invention will be described in detail with reference to certain exemplary embodiments. In FIG. 1, when a character code P specifying a character to be printed is applied to a character memory 1, the memory feeds the corresponding character out in the form of a matrix of $m \times n$ (= Q) dots. The character data Q produced in the form of $m \times n$ dot matrix from the character memory 1 is applied to a matrix size converter 2. The matrix size converter 2 converts the input $m \times n$ dot matrix Q into a $k \times l$ dot matrix R of a different size according to an instruction from a character generations controller 4 or provides the input as it is as an input to a printing head. The printing head has a number of recording pins, the number corresponding to one row of dot matrix, arranged in a vertical line and is shifted rightwardly by a distance corresponding to one dot in response to the instruction from the character generation controller every after a printing of one row is completed. The dot matrix character signal applied to printing head 3 is printed according to a print timing signal generated by character generation controller 4. The matrix selection output of character generation controller 4 switches the matrix size converter 2 and controls the remainder of elements 1, 2 and 3 to thereby control the size of the printed character.

Figure 3:
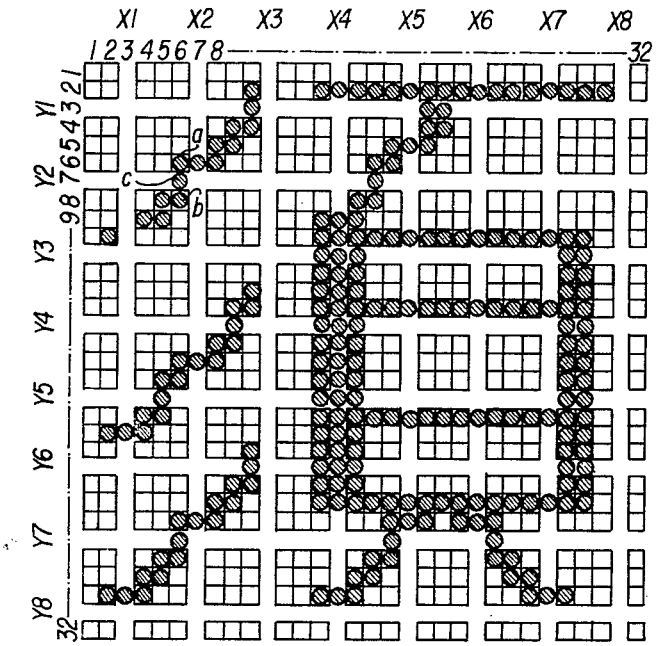
FIG. 3 illustrates a pattern of 32 × 32 dot matrix obtained by conversion of the original character pattern of FIG. 2 by the present invention.
Figure 2:
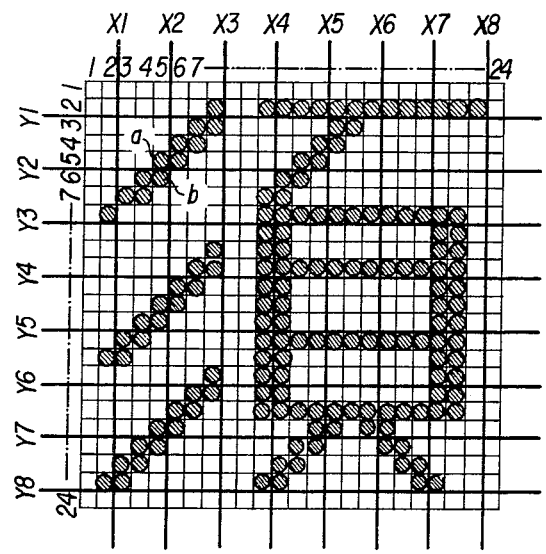
FIG. 2 illustrates an original character pattern consisting of a 24 × 24 dot matrix.

In the example of FIG. 1, a single matrix size converter 2 is provided to achieve printed in two sizes. The provision of a plurality of these converters makes it possible to print many character sizes. Referring now to an exemplary case of converting a 24 × 24 dot matrix into a 32 × 32 dot matrix, a description of the construction and operation of matrix size converters will now be given. FIG. 2 illustrates an original pattern consisting of a 24 × 24 dot matrix. For conversion of this pattern into a 32 × 32 dot matrix as shown in FIG. 3, it is necessary to add 8 dots both vertically and horizontally. To effect this, the columns and rows of the original pattern are respectively divided into groups where the number of groups is one greater in number than the additional dots that must be added. The dividing lines between the groups of columns are labeled $\times 1 \ldots \times 8$ while the dividing lines between the groups of rows are labeled $y1 \ldots y8$ in FIG. 2. Each incremental column or row is inserted between divided adjacent groups, thereby enlarging the matrix as illustrated in FIG. 3.

Figure 4:
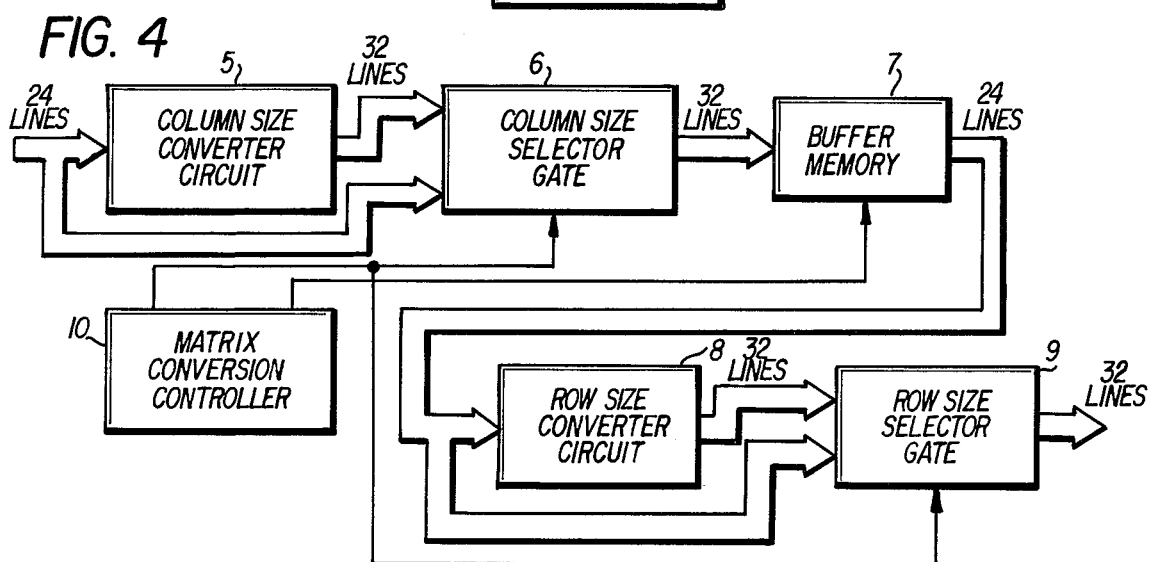
FIG. 4 is a block diagram of an illustrative matrix size converter in accordance with the present invention.
Figure 5:
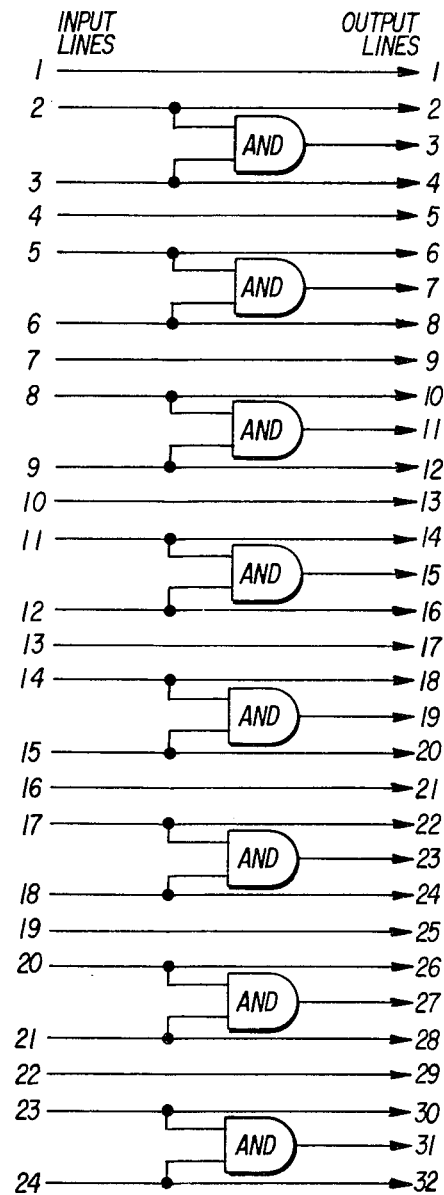
FIG. 5 is a schematic circuit diagram of an exemplary logic circuit for converting matrix size.

Practically, dot matrix conversion is performed first for the rows and subsequently for the columns, as indicated in the block diagram of FIG. 4. It is of course possible, however, to reverse the sequence. A row size converter circuit 5 may typically be a logic circuit as shown in FIG. 5.

In the divided dot matrix of FIG. 2, opposed bits in the rows on opposite sides of the dividing lines between adjacent row groups are compared with each other. For example, the opposed bits in the fifth and sixth rows on opposite sides of dividing line X 2 in FIG. 2 are compared with each other and the sum of the logical signals representing each pair of opposed bits of these rows is determined. A "1" output bit is produced when the logical signals are both "1" while an "0" output bit is produced for all other cases. This can be effected by the logic circuit of FIG. 5 where each output of the AND circuits is a bit for a new row which is inserted between the divided row groups. Thus, when the 24 × 24 dot matrix is fed column by column 24 times to a row size converter circuit 6, its output is a matrix composed of 32 rows which may be stored as a 24 (column) × 32 (rows) dot matrix in a buffer memory 7.

The stored data may then be read out and applied row by row 32 times to a column size converter 8 to have its number of columns increased. In a manner similar to the foregoing, the opposed bits in the rows on opposite sides of the dividing lines between adjacent column groups are compared with each other, and the sum of the logical signals representing each pair of opposed bits of these columns is determined. And a "1" output bit is produced when the logical signals are both "1" while an "0" output bit is produced for all other cases. This also can be effected by the logic circuit of FIG. 5 where each output of the AND circuits is a bit for a column which is inserted between the divided column groups. As a result, the rows and columns are so increased that a 32 × 32 dot matrix results. A matrix conversion controller 10 may be provided to control timing of the above-described operation so that the original 24 × 24 dot matrix is fed column by column 24 times to converter 5 and the 24 × 32 dot matrix outputted therefrom is fed column by column 32 times to converter 8.

Describing the above in more detail, in FIG. 1, the character memory 1 stores the character pattern to be used in the 24 × 24 dot matrix form. The character memory 1 is supplied with a character code P and a row selection signal from the character generation controller 4 and provides pattern data of the selected one row (24 bits) in parallel which data is fed to the matrix size converter 2. The matrix size converter 2 has a construction shown in FIG. 4.

Figure 7:
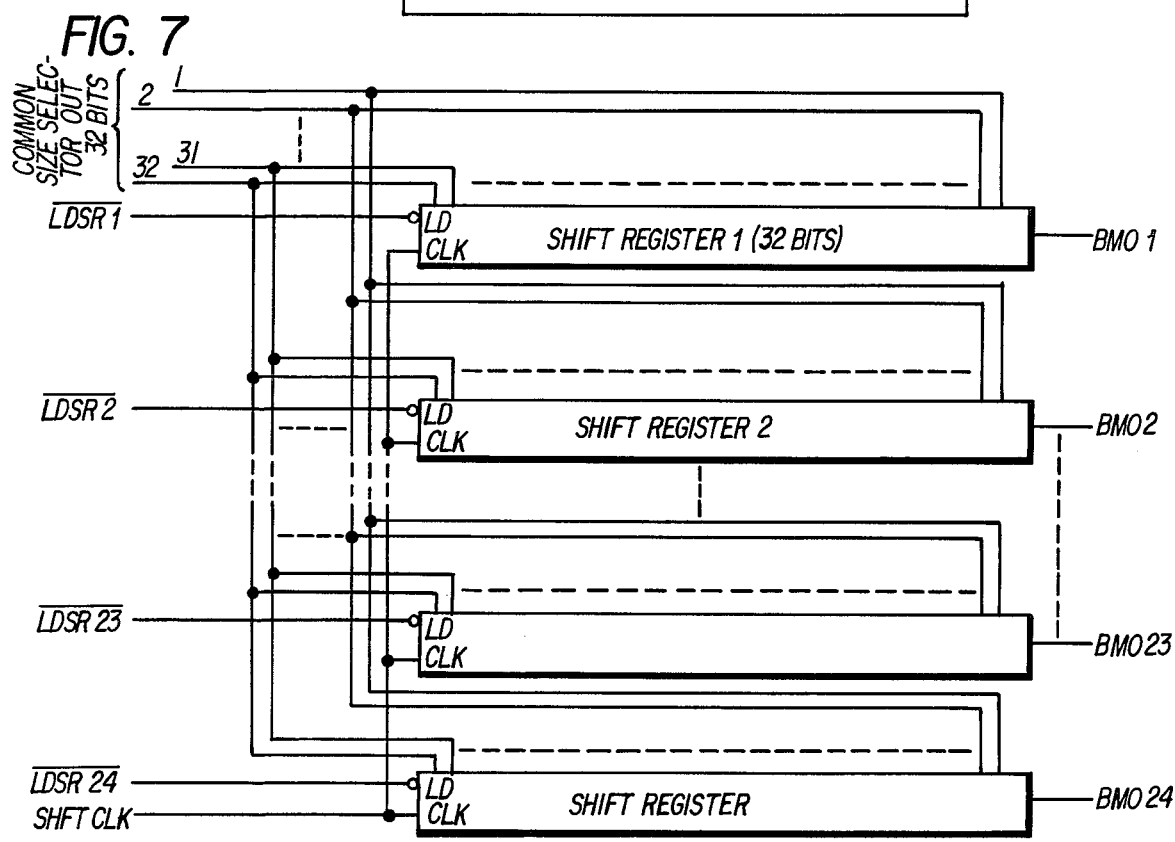
FIG. 7 is a circuit diagram of the buffer memory in FIG. 4.
Figure 6:
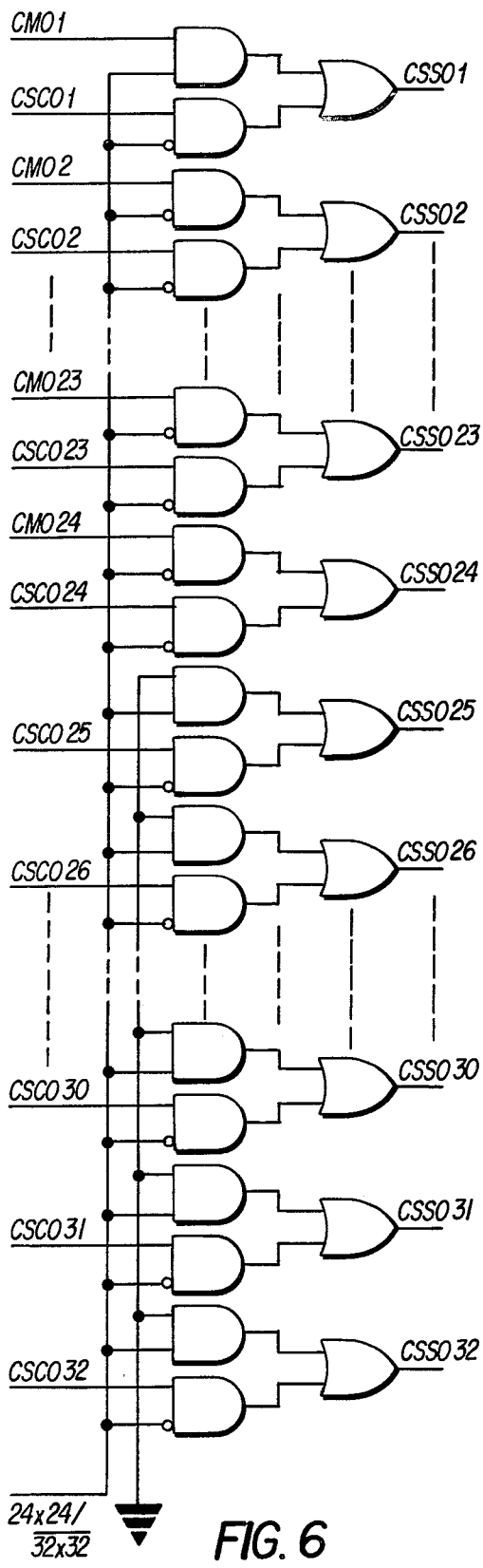
FIG. 6 is a circuit diagram of the column size selector gate in FIG. 4.

The character pattern data of one row from the character memory is fed to the column size converter 5. The column size converter is constituted with the same circuit as shown in FIG. 5 and converts the 24 bits data into the 32 bit data which is fed to one of the inputs of the column size selector gate 6. The latter gate is constituted with the same circuit as shown in FIG. 6 and the other input thereof is supplied with the output of the character memory 1. The character size selector gate 6 functions to supply either of the character memory 1 or the 32 bit data according to the value of the character size selection signal (24 × 24/$\overline{32 \times 32}$) supplied thereto from character generation controller 4 through the matrix size controller 10. The output of the character size selector gate 6 is supplied to the buffer memory 7. The buffer memory 7 is composed of twenty-four 32 bit parallel input shift registers (FIG. 7) and, upon a load signal ($\overline{LDSR1}$ - $\overline{LDSR24}$) from the matrix conversion controller 10, data of column is loaded on each shift register. By loading 24 columns on the shift registers in response to the load signals $\overline{LDSR1}$ to $\overline{LDSR24}$, the buffer memory 7 stores the character pattern data of one complete character. If, the selection input of the column size selector gate 6 is assigned to 32 × 32, each of the shift registers can contain a pattern data of 32 bits. Therefore, the dot matrix may become 24 columns × 32 rows.

Figure 8:
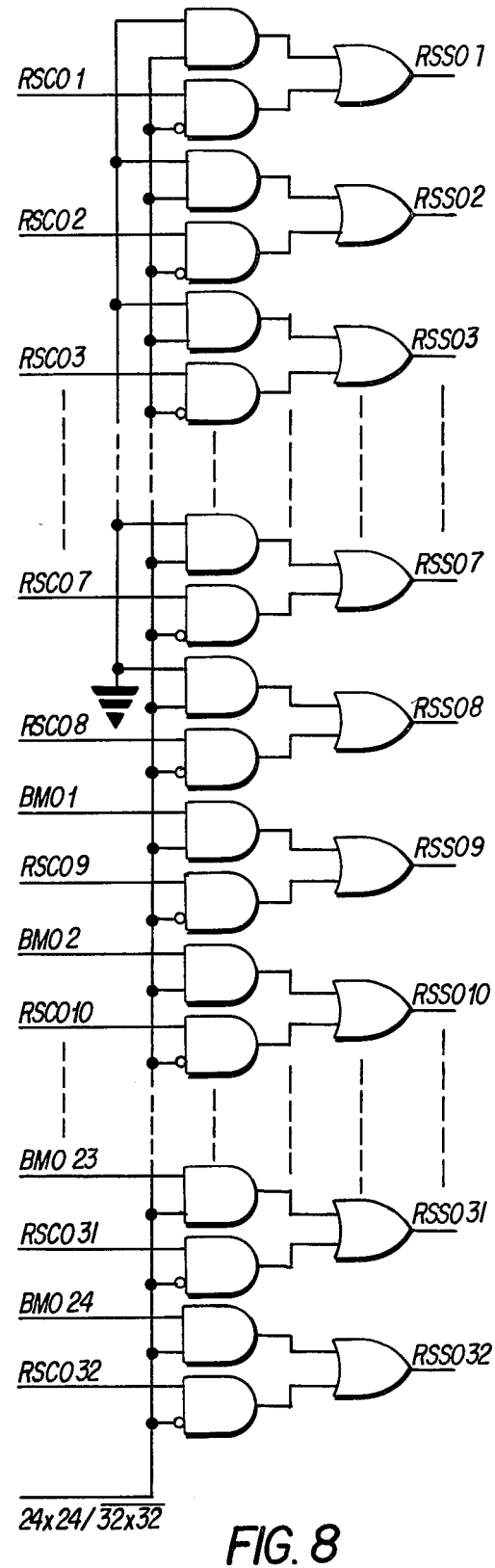
FIG. 8 is a circuit diagram of the row size selector gate in FIG. 4.

The output of the buffer memory 7 is supplied to the row size converter circuit 8 as a parallel data of one row. The row size converter circuit 8 has the same construction as that of the column size converter circuit 6 and converts the character pattern data containing 24 bits per one row into a data of 32 bits. The series data obtained by the conversion is supplied to one of the inputs of the row size selector gate 9. The row size selector gate 9 is constituted as shown in FIG. 8 and the other input thereof is supplied with the output (24 bits) of the buffer memory 7. The gate 9 provides, as its output, either the converted data or the output of the buffer memory 7 in response to the matrix size selection signal (24 × 24/$\overline{32 \times 32}$). The output of the gate 9 is supplied to the printing head 3. The printing head 3 performs a printing of one row upon receipt of a print enable signal from the character generation controller 4. After completion of the printing of one row, the character generation controller 4 generates a print head step pulse upon which the printing head 3 is shifted rightwardly by one dot.

At the same time, the matrix conversion controller 10 generates a shift clock upon which all of the shift registers of the buffer memory 7 are shifted simultaneously by one bit and provides the next one row as its output.

The printing of one complete character is performed by repeating the above operation 25 or 32 times. When the one character printing is completed, the character generation controller generates a required number of print head step pulses to provide a desired space between the adjacent character.

Figure 9:
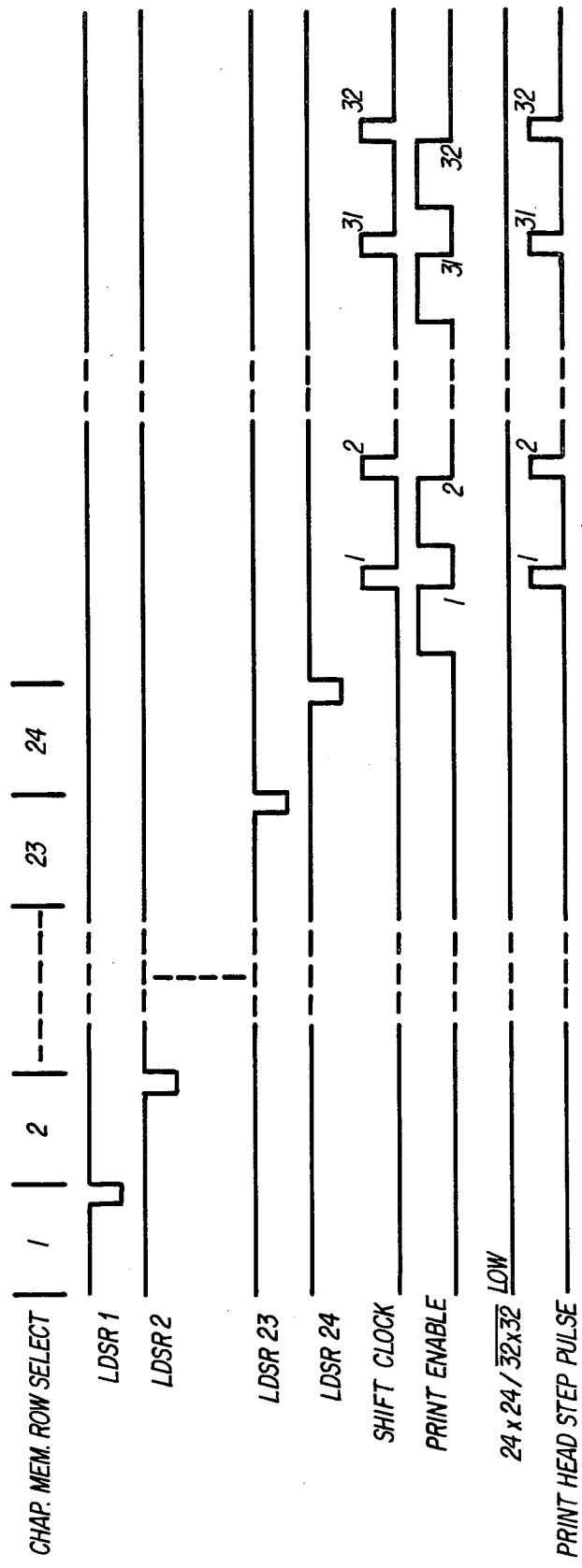
FIG. 9 is a timing diagram of the operation of the circuitry of the present invention.

FIG. 9 is a time chart of the operation mentioned above, for a case where the conversion to the 32 × 32 matrix is to be performed.

When it is desired to provide the output of 24 × 24, the signal of 24 × 24/$\overline{32 \times 32}$ may be made high and each of the shift clock signal, print enable signal and print head step pulse signal may be composed of 24 pulses, respectively.

When the printing is performed with using the timing in FIG. 9, there is a disadvantage that the printing speed is low, because the printing is performed row by row after the character patterns are read out from the character memory row by row and then the character patterns for one complete character are stored in the buffer memory. However, the printing speed can be improved by providing a buffer memory having a capacity capable of storing two complete characters and by alternatively reading out one character while the other is being printed.

Thus, if a character font of one matrix size is stored in a character memory of a printer, a character consisting of a dot matrix equal to or larger than that size may be printed by the use of the dot matrix converter of the present invention. This is obviously applicable to any printing process such as electrostatic recording, thermal recording or CRT printing. If certain characters are particularly complicated and therefore dot matrix conversion thereof would cause extreme deterioration of the character quality, it is possible to provide a configuration equipped with character memories of desired dot matrix sizes for only the complicated characters and perform matrix conversion for the uncomplicated characters. Although the foregoing embodiment relates to conversion into a dot matrix consisting of mutually equal rows and columns in number, it will be readily understood that employment of the present invention permits printing of a vertically longer or horizontally longer character by making the row and column enlargement ratios different from each other. Further the enlargement ratio for either a row or column may be one whereby enlargement would occur only in the direction where the enlargement ratio is greater than one. In this latter embodiment, converter 8 would, of course, not be needed.

Thus, there has been disclosed a dot matrix size converter for converting a signal representing an original $m \times n$ matrix where each row of said matrix comprises $m$ signal bits and each column comprises $n$ signal bits and where at least one of the two dimensions of the matrix is enlarged. The converter comprises dividing means (the grouping of lines 1–24 in FIG. 5) for dividing the $m$ rows of the matrix in a plurality of row groups so that imaginary dividing lines (Y1–Y8), respectively, exist between adjacent row groups, the number of row groups being $k - m + 1$ where $k$ equals the number of rows in the converted matrix signal to be produced by the converter. Logic means (the AND circuits of FIG. 59 are provided and are responsive to the dividing means for comparing each pair of opposed signal bits (for example, bits $a$ and $b$ of FIGS. 2 and 3) in the rows an opposite sides of the imaginary dividing lines between adjacent row groups and determining the logical sums of the pairs of opposed signal bits.

Means (the output lines from the AND circuits of FIG. 5) responsive to the logic means are also provided for inserting a "1" output bit (for example, bit $c$ of FIG. 3) between a pair of adjacent row groups whenever the logical sum of the pair of opposed signal bits corresponding to the pair of adjacent row groups is "1", the inserted signal being inserted between the opposed bits from which it was determined and an "0" output bit being inserted whenever said logical sum is "0" whereby the converted matrix signal is produced.

What is claimed is:

1. In a dot matrix display system including character printers having means for displaying characters represented as an array of bits, using a source of bit signals in a matrix array whose elements correspond to the dots of the intended character, a dot matrix size converter for enlarging an original $m \times n$ matrix where each row of said matrix comprises $n$ signal bits and each column comprises $m$ signal bits and where at least one of the two dimensions of said matrix is to be enlarged, said converter comprising:

signal selecting means for selecting from the $m$ rows of signal bits of said matrix a plurality of row groups where each row group includes at least a first row which is adjacent to a second row in a row group adjacent to the aforementioned row group, the number of row groups of signal bits being $k - m + 1$ where $k$ equals the number of rows in the enlarged matrix signal to be produced by said converter;

logic means responsive to said signal selecting means for comparing each pair of opposed signal bits in said first and second rows and determining the logical sums of said pairs of opposed signal bits; and means responsive to said logic means for inserting a "1" output signal bit between said first and second rows whenever said logical sum of said pair of opposed signal bits is "1", the inserted signal being inserted between the said opposed bits from which it was determined and a "0" output bit being inserted whenever said logical sum is "0", whereby said enlarged matrix signal is produced for displaying.

2. A dot matrix converter as in claim 1 where both of said two dimensions are enlarged, said converter including further signal selecting means for selecting from the $n$ columns of signal bits of said matrix a plurality of column groups where each column group includes at least a first column which is adjacent to a second column in a column group adjacent to the aforementioned column group, the number of column groups being $l - n + 1$ where $l$ equals the number of columns in the converted matrix signal to be produced by said converter;

further logic means responsive to said further signal selecting means for comparing each pair of opposed signal bits in said first and second columns and determining the logical sums of said pairs of opposed signal bits; and means responsive to said further logic means for inserting a "1" output signal bit between said first and second columns whenever said logical sum of said pair of opposed signal bits is "1", the inserted signal being inserted between the said opposed bits from which it was determined and a "0" output bit being inserted whenever said logical sum is "0", whereby said enlarged matrix signal is produced.

3. A converter as in claim 1 including means for selecting between said original matrix signals and said enlarged matrix signals and outputting the selected matrix to a printer or the like.

* * * * *